Dec. 24, 1968 W. E. PAYNE ET AL 3,418,305
POLYMER DRYING PROCESS
Filed Nov. 25, 1964
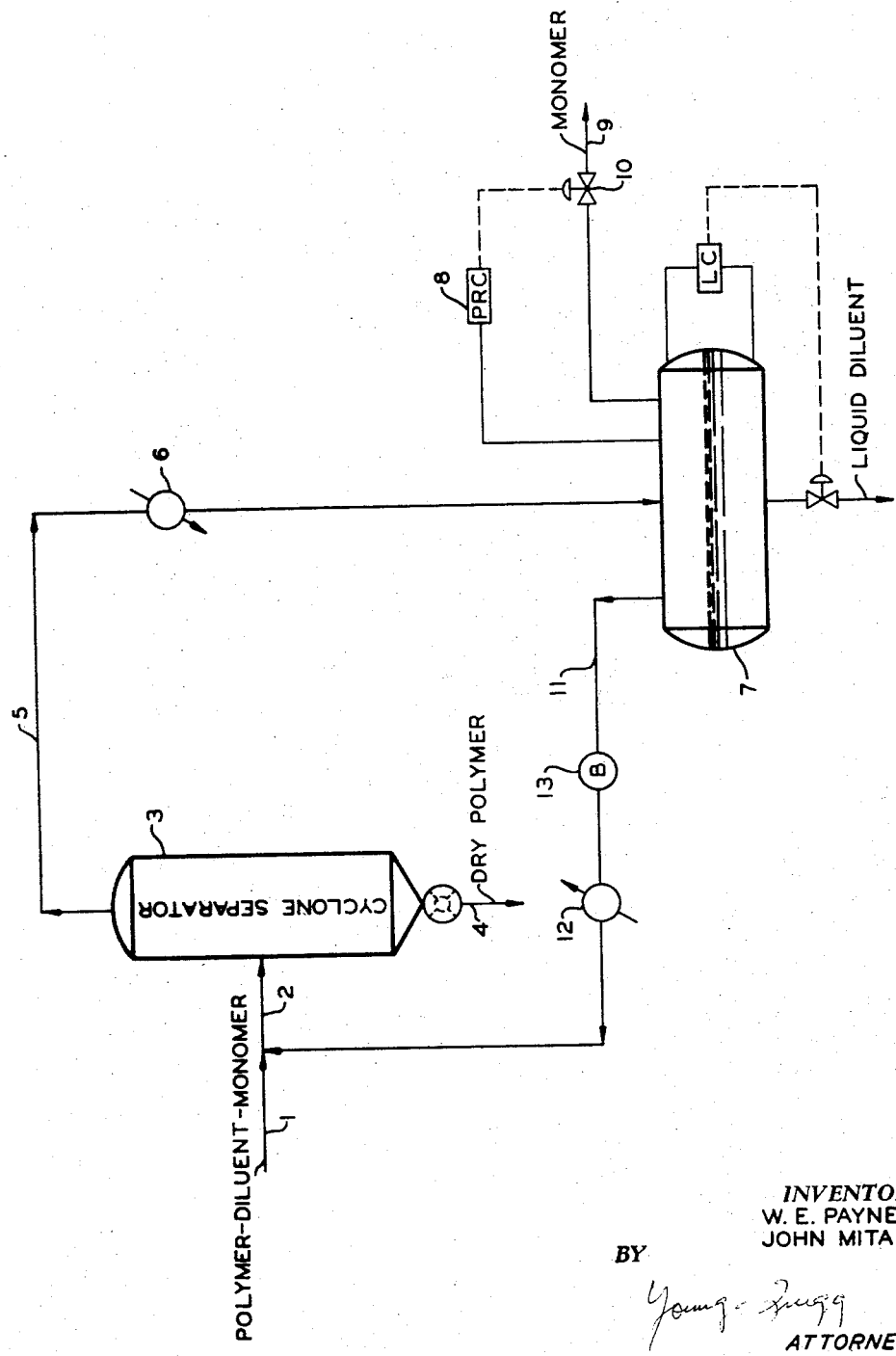
INVENTORS
W. E. PAYNE
JOHN MITACEK
BY
*Young-Grigg*
ATTORNEYS

United States Patent Office

3,418,305
Patented Dec. 24, 1968

3,418,305
POLYMER DRYING PROCESS
William E. Payne and John Mitacek, Bartlesville, Okla., assignors to Phillips Petroleum Company, a corporation of Delaware
Filed Nov. 25, 1964, Ser. No. 413,817
7 Claims. (Cl. 260—94.9)

This invention relates to drying of polymers. In one of its aspects, it relates to drying a solid polymer of olefin wherein the polymer is polymerized in a particle form polymerization process and the reactor effluent is mixed with a stream of hot gases containing a monomer of the solid polymer. In another of its aspects, the invention relates to a process for separating a solid polymer from a polymerization reactor effluent, said method comprising admixing said reactor effluent with a stream of hot gases containing a monomer of the solid polymer, vaporizing the liquid effluent, passing the vapors and solid polymer to a separator, removing the solids from the vapors, separating the monomer from the effluent and recycling the monomer. In another of its aspects, the invention relates to treating a slurry of solid polymer with a heated gas containing a monomer of the solid polymer to separate the solid polymer from liquid by vaporizing the liquids with the monomer gas, separating solids from gaseous constituents, separating monomers from vaporized liquids and recycling the monomer. In a still further aspect, the invention relates to an apparatus for drying a solid polymer of ethylene of liquid diluent comprising a conduit for admixing polymerization reaction products containing a diluent with a hot gas, means for separating solid polymer from vapors, means for condensing diluent vapors, and means for separating condensed vapors from uncondensed vapors, means for recycling said monomer gas and means for maintaining a predetermined pressure in said gaseous cyclic system.

In the polymerization of olefins according to the particle form or solution polymerization process, the effluent frm the polymerization reactor contains a diluent and a polymer. Some of the diluent dissolves in the solid polymer even after precipitation of same in the solution process making it difficult to separate the diluent from the solid polymer. Many methods of separation of diluent from polymer have been proposed. One method involves steam stripping the diluent from the solid polymer. Another method flash vaporizes heated diluent. Still another method heats the effluent from the reactor to vaporize the diluent and then separates the solid polymer from the vaporous diluent. We have now discovered that a more complete separation of diluent and polymer, and a more effective drying of the polymer results when the effluent from the polymerization reaction is mixed with a hot gas containing a monomer of the solid polymer, using the hot monomer gas as a drying gas to vaporize the diluent in the reaction effluent.

It is therefore an object of this invention to provide an effective drying method for olefin polymerization reaction polymers.

It is a further object of this invention to provide a method for separation of a solid polymer of an olefin from reaction diluent.

It is a still further object of this invention to provide an apparatus for efficiently drying solid olefin polymers and separating same from the reaction effluent.

Other aspects, objects, and the several advantages of this invention are apparent to one skilled in the art from a study of this disclosure, the drawing and the appended claims.

According to the invention, diluent from a polymerization reaction is separated from solid polymer by contacting a mixture of the diluent and polymer with a hot gas containing a monomer of the solid polymer. More specifically, a slurry of solid polymer and diluent and/or other liquids from a polymerization reaction are passed to a conduit which contains a cycling hot gas of a monomer of the polymer. The hot gas vaporizes the reaction diluent and other liquids, and provides an efficient method of removing any diluent which is dissolved in the solid polymer. The polymer can then be separated from the vapors using any conventional separation apparatus such as a cyclone separator.

The drying process is applicable to polymers of 1-olefins such as ethylene, propylene, 1-butene, and copolymers thereof.

Any diluent used in the polymerization reaction can be separated from a solid polymer produced therein. Examples of such diluent are n-pentane, hexane, cyclohexane, and the like.

Monomers used as the drying gas are preferably those monomers of the polymer to be dried. For example, if polyethylene is to be dried, the drying monomer gas would preferably be ethylene.

The invention can be better understood by reference to the accompanying drawing which is a schematic of the process according to the invention.

Referring now to the drawing, polymerization reactor effluent passes through line 1 and is admixed with hot gases in conduit 2. The hot gases in conduit 2 contain substantially a monomer of the polymer in the reaction effluent 1. The polymerization reactor effluent 1 contains solid polymer and polymerization diluent. It can also contain unpolymerized monomers and intermediate polymerization products. The hot gases in conduit 2 vaporize the liquid diluent in the reactor effluent from the reaction effluent. The solid polymer, the vaporized diluent, and the other gases are passed to cyclone separator 3 wherein the solid polymer is removed through line 4 and the gases and vapors are removed through overhead line 5. Suitable valving means such as a star valve can be used to pass the solid polymers from the cyclone separator 3 and line 4. Overhead vapors from separator 3 pass through condenser 6 and into accumulator 7 wherein the diluent is separated from the light gaseous component. A constant pressure is maintained in the system by venting monomer gases through line 9 in accordance with the pressure in accumulator 7. The pressure controller 8 senses the pressure in the accumulator 7 and according to a predetermined pressure limit operates valve 10 to remove the monomer gases. The majority of the monomer gases are removed through line 11 and pass through blower 13, heater 12 and recycled to the operation.

As an example of how the process can work, the reactor effluent containing six pounds per hour of ethylene polymer, four pounds per hour of ethylene and twenty-five pounds per hour of pentane are passed into conduit 2 and therein admixed with 39 pounds per hour of ethylene at 200° F. In this example, the mol fraction of pentane in the vapors passing through the cyclone separator is 0.2. This means that the pentane is less likely to be taken up by the polymer than if superheated pentane, for example, were used.

By using the monomer of the polymer produced, the solubility of pentane in the polymer is decreased because of the low partial pressure of the diluent. This complete drying process leaves the surface of the solid polymers free from diluent, thus eliminating or minimizing agglomeration of particles. It is also obvious that by using the transport conduit 2 to vaporize the diluent, the requirement of a fluidized bed dryer is eliminated.

Another advantage of using the monomer of the polymer produced is that the monomer from line 9 can be recycled to the polymerization process.

It is within the scope of the invention to use, as a source of polymer slurry in line 1, the reaction products from a solution form polymerization process. In such a case, the reaction effluent can be treated to precipitate the polymer or separate part of the diluent for example. Further, any reaction products, from particle form or solution form process, can be separated to remove some of the diluent, or otherwise treated before being poured into line 1 to be finally dried.

The weight ratio of hot gas to liquid in line 2 can be 1:1 to 100:1, preferably 2:1 to 10:1. The ratio of monomer gas to total gas in 11 can be 10:1 to 1:1, preferably 5:1 to 1:1.

The invention is also applicable to the recovery of polymer from a mass polymerization reaction effluent, i.e., one in which olefin monomer acts as both reactant and as diluent for the polymer. In the mass polymerization of propylene, the reactor effluent consists of polypropylene and liquid propylene as the diluent. Our invention is especially suited for recovery of polypropylene from such a reaction mixture and uses hot propylene gas as the drying and transport medium.

Reasonable variation and modification are possible within the scope of the foregoing disclosure, the drawing and the appended claims to the invention, the essence of which is that solid polymers of olefins are dried of reaction diluent by contacting the reaction effluent from a polymerization reactor with a hot gas containing a monomer of the solid polymer.

We claim:

1. A method for separating an olefin polymer from a polymerization diluent, said method comprising feeding an effluent from a polymerization reaction wherein a monomer is polymerized to produce said polymer in the presence of said diluent into a stream of gas containing said monomer, passing said stream to a separator through a conduit wherein said diluent is vaporized, and separating said polymer from said gaseous components.

2. A method according to claim 1 wherein vapor, taken from said separator, is cooled to condense said diluent, said monomer is separated from said diluent, and a portion of said monomer is heated and recycled.

3. A method according to claim 2 wherein the pressure of gases in the system is measured, and a portion of said monomer gas is removed from said system in accordance with a predetermined pressure.

4. In a drying process wherein solid polymers of 1-olefins are dried of liquid polymerization diluent by passing said polymer and diluent from a reactor to a conduit containing hot gases to vaporize said diluent so that said polymer can be gravitationally separated from said diluent, the improvement which comprises using a gas containing substantially a monomer of said polymer as said hot gas.

5. A process according to claim 4 wherein said monomer gas containing vaporized diluent is separated from said polymer, cooled to condense said diluent, separated from said diluent, and a portion of said separated monomer gas is heated and recycled.

6. A process according to claim 4 wherein said polymer is polyethylene and said monomer is ethylene.

7. A process for separating a solid polymer of ethylene from polymerization reaction diluent containing said polymer, ethylene, and n-pentane, said process comprising passing said effluent to a conduit containing heated ethylene, in said conduit vaporizing said pentane, passing said vaporized pentane, ethylene, and polymer to a cyclone separator, separating said polymer from said vaporized pentane and ethylene, cooling said vaporous phase to condense said pentane, separating ethylene from said pentane in a liquid vapor separator, heating a portion of ethylene separated from pentane and recycling said heated ethylene, sensing the pressure in said liquid vapor separator and removing a portion of ethylene from a system in accordance with a predetermined pressure limit.

References Cited
UNITED STATES PATENTS

| | | | |
|---|---|---|---|
| 2,726,231 | 12/1955 | Field et al. | 260—94.9 |
| 2,728,753 | 12/1955 | Russum et al. | 260—94.9 |

JOSEPH L. SCHOFER, *Primary Examiner.*

L. EDELMAN, *Assistant Examiner.*

U.S. Cl. X.R.

260—88.2, 93.7